US008744388B2

(12) United States Patent
Kraft et al.

(10) Patent No.: US 8,744,388 B2
(45) Date of Patent: Jun. 3, 2014

(54) DYNAMIC RADIO DATA SYSTEM OPTIONS

(75) Inventors: Christian R. Kraft, Frederiksberg C (DK); Peter D. Nielsen, Kgs Lyngby (DK); Hans-Christoph Quelle, Dusseldorf (DE); Mikko Makipaa, Helsinki (FI)

(73) Assignee: Nokia Corporation, Espoo (FI)

( * ) Notice: Subject to any disclaimer, the term of this patent is extended or adjusted under 35 U.S.C. 154(b) by 1435 days.

(21) Appl. No.: 12/227,811

(22) PCT Filed: May 30, 2006

(86) PCT No.: PCT/IB2006/001416
§ 371 (c)(1),
(2), (4) Date: Nov. 22, 2010

(87) PCT Pub. No.: WO2007/138375
PCT Pub. Date: Dec. 6, 2007

(65) Prior Publication Data
US 2011/0065402 A1    Mar. 17, 2011

(51) Int. Cl.
*H04B 1/18* (2006.01)
(52) U.S. Cl.
USPC .................. 455/179.1; 455/3.02; 455/161.1
(58) Field of Classification Search
USPC .............. 455/3.02, 3.06, 150.1, 151.1, 154.1, 455/157.1, 161.1, 179.1, 180.1, 185.1, 455/186.1
See application file for complete search history.

(56) References Cited

U.S. PATENT DOCUMENTS

| | | | | |
|---|---|---|---|---|
| 5,828,313 A | * | 10/1998 | Mochizuki | 340/7.53 |
| 6,078,592 A | * | 6/2000 | Spiero | 370/474 |
| 8,229,983 B2 | * | 7/2012 | Walker et al. | 707/899 |
| 2002/0033779 A1 | * | 3/2002 | Nakai et al. | 345/2.1 |
| 2002/0055343 A1 | | 5/2002 | Stetzler et al. | 455/260 |

FOREIGN PATENT DOCUMENTS

| | | |
|---|---|---|
| TW | 200616368 A | 5/2006 |
| WO | WO 2004/055999 A1 | 7/2004 |
| WO | WO 2004/102844 A2 | 11/2004 |
| WO | WO 2004/102845 A1 | 11/2004 |

OTHER PUBLICATIONS

"Radiotext plus (RTplus) Spectification (Version 1.0)", Jun. 13, 2005, http://www.1david6.com/News/R05_0361; 8 pgs.

* cited by examiner

*Primary Examiner* — Nhan Le
(74) *Attorney, Agent, or Firm* — Harrington & Smith

(57) ABSTRACT

A broadcast radio event such as a song or a concert promotion, and a plurality of radio data fields corresponding to the event such as RTplus information, are received at a device. A user selects to display broadcast radio options simultaneous with receiving the broadcast radio event. Then is displayed a set of user-selectable options, at least one o which is derived from at least one of the radio data fields. In various embodiments, each time a new set of radio data fields are received, the set of displayed options is updated, with certain provisions to 'freeze' the displayed set of options. Examples of a derived option include a link to an Internet page, a phone number or email address, and posting a time and place of an advertised event to a calendar. A method, device, computer program product, and apparatus are detailed.

22 Claims, 4 Drawing Sheets

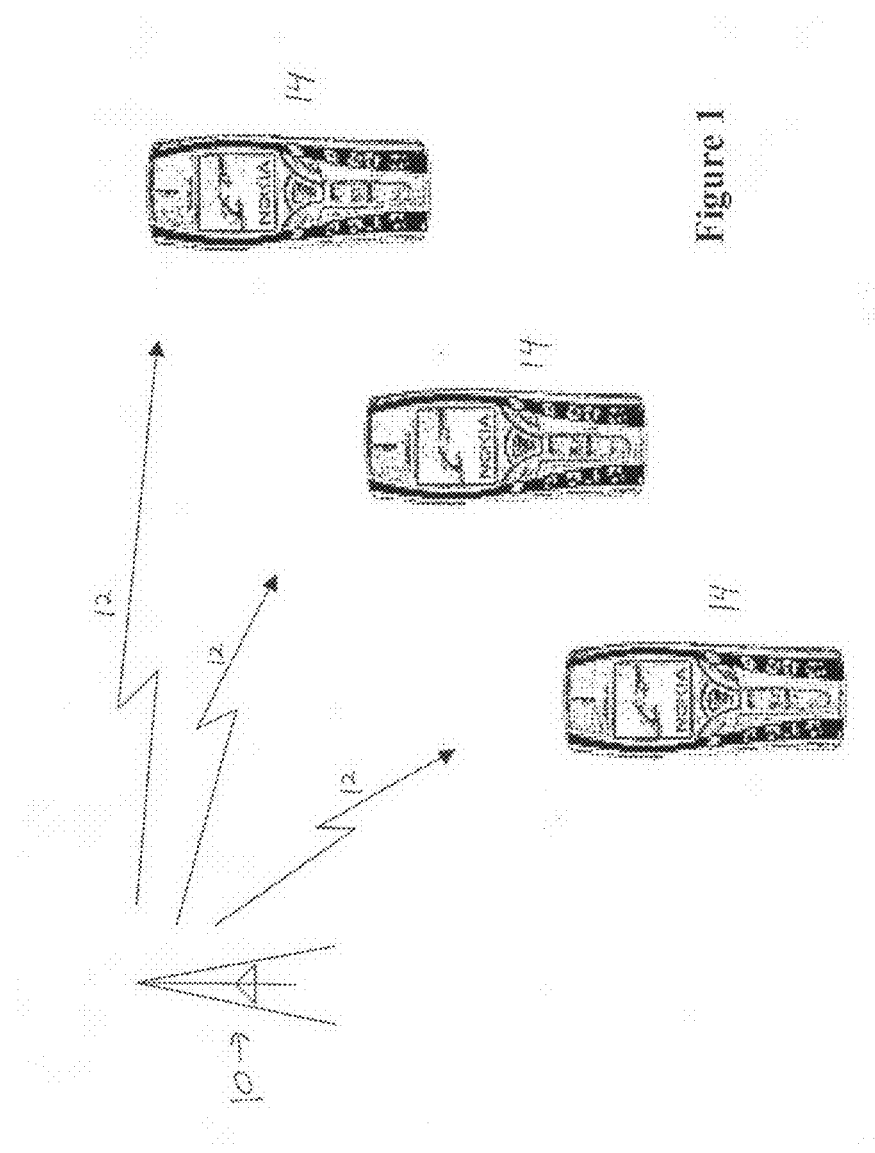

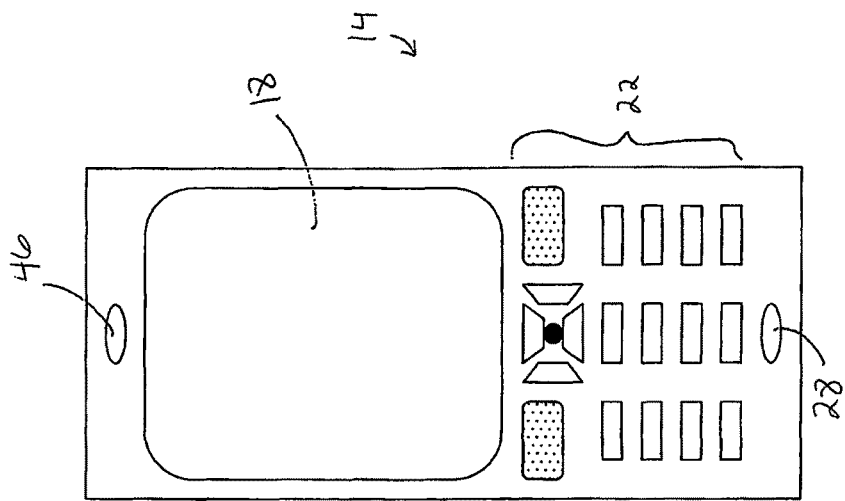
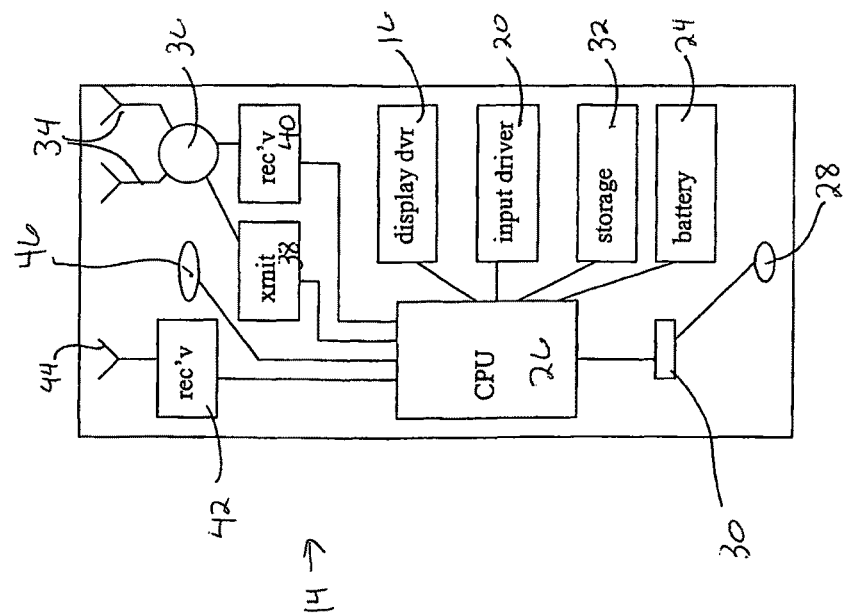
Figure 2A
Figure 2B

DYNAMIC RADIO DATA SYSTEM OPTIONS

TECHNICAL FIELD

The present invention relates to broadcast radio such as within the AM or FM bands, and particularly relates to rendering a display at a broadcast radio receiver device based on (radio data system RDS or RTplus) information received over a broadcast radio channel.

BACKGROUND

Broadcast radio has adapted to the digital music environment by adding RDS information to its broadcasts. The term broadcast radio is used herein consistent with its normal understanding, a wireless transmission intended for public reception, rather than a point t point message. Radio Data System RDS is text and data transmitted with a broadcast radio signal by radios with an RDS decode capability, which typically display some of the RDS information as text to a user.

There are fifty or more different RDS categories, including station name, program type or PTY flag (e.g., pop, rock, talk radio); travel announcement or TA flag, enhanced other networks or EON flag, alternative frequency or AF flag, time and date or CF flag, and radio text. The station name is generally eight digits maximum, such as "Jazz FM" or the actual station identifier (e.g., BBC4, WTIC). The TA flag can be switched on when a radio station starts a travel report, and switched off at the end, so that the user's RDS compatible radio receiver can switch to a station carrying travel news (or in a car, pause a cassette or a CD) when local travel news is broadcast. The EON flag allows an RDS radio receiver to know about other associated stations, so a radio can know that when listening to one program, it should keep an ear on another (local) station for relevant travel news. The AF flag contains information about the current station's other FM frequencies, so that the radio can switch to a better signal while driving. The CF flag carries the current date and time, which automatically resets the clock in RDS clock radios and updates for seasonal time changes.

The radio text information 'scrolls' across RDS radio displays, providing information that's sent from the radio station. When a compatible radio receiver is tuned to a broadcast radio station that broadcasts RDS information, the receiver is tuned to a broadcast event and displays on a graphical display interface certain of the RDS information as text, such as the station name, program type, or information about a song being played such as title, artist, and/or album. This is not normally fitted to an in-car radio, as it's seen as a distraction to drivers.

The original RDS was developed by the European Broadcast Union EBU in 1984. Among those skilled in the art, the features of RDS are known by a large number of abbreviations, such as PS (Program Service name), PTY (Program Type), AF (Alternative Frequency list) and ODA (Open Data Applications). A more detailed review of RDS and its latest advancement, Radiotext Plus (RTplus), can be found in the specification entitled: "Radiotext plus (RTplus) Specification" (version 1.0), RDS Forum 2005 R05/036_1. RTplus was jointly developed by the Westdeutscher Rundfunk WDR, Nokia Corporation and the Institut für Rundfunktecknik IRT.

RTplus provides additional information elements over standard RDS. Some examples illustrate the potential uses of these additional information elements. While a broadcast station broadcasts a song, RTplus provides classes of information while that song is being broadcast, in addition to regular RDS, that may indicate when and where the song artists might be playing in concert locally. The broadcast radio station may promote a contest, and the RTplus information broadcast with that promotion might provide a phone number, email address, and/or SMS address to register a vote or entry in that contest. While broadcasting an advertisement, the associated RTplus information might provide a link to an Internet page (URL) that relates to the product or service being advertised. While broadcasting a weather report or news, RTplus may provide a link to the broadcast station's local weather page or breaking news page of its web domain. Much like domains within the Internet, RTplus provides a depth of information that may be further explored by interested users, in this case, interested radio listeners.

What is needed in the art is a way to facilitate interested users to access and explore that additional information that RTplus provides.

SUMMARY

The foregoing and other problems are overcome, and other advantages are realized, in accordance with the presently described embodiments of these teachings.

In accordance with one aspect, the invention is a method for displaying a plurality of radio options. In the method, a broadcast radio event and a plurality of radio data fields corresponding to the event are received at a device. Simultaneous with receiving the broadcast radio event, the method automatically displays a set of user-selectable options. The set of options includes at least one option that is derived from at least one of the radio data fields. In various embodiments, each time a new set of radio data fields is received, the set of displayed options is updated. According to some embodiments, update of the displayed options is suspended until the user selects, after the new set of radio data fields are first received, to display the broadcast radio options.

In accordance with another aspect, the invention is a device for displaying a set of user-selectable options. The device includes a graphical display screen and a broadcast radio receiver coupled to an antenna for receiving broadcast radio events and a plurality of associated radio data fields. The device further includes a processor coupled to the radio receiver and the display screen. The processor is for causing the graphical display screen to display a set of user-selectable options. At least one option of the set is derived from at least one of the radio data fields.

In accordance with another aspect, the invention is a program of machine-readable instructions, tangibly embodied on an information bearing medium and executable by a digital data processor, to perform actions directed toward displaying a set of user-selectable options. The actions include displaying a set of user-selectable options, at least one of which is derived from at least one of the radio data fields. That action occurs simultaneous with receiving a broadcast radio event with which the radio data fields are associated.

In accordance with another aspect, the invention is an apparatus that includes means for deriving from at least one broadcast radio data field a derived option, and means for displaying a plurality of broadcast radio options, where the plurality includes the derived option. As an example, the means for deriving may include a broadcast radio receiver coupled between an antenna and a processor, where the broadcast radio receiver is for receiving radio events and associated RTplus information. The means for displaying may by example include a graphical display screen coupled to the processor.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein:

FIG. 1 is a diagram showing the context of the invention, multiple mobile stations equipped to receive RDS and/or RTplus radio broadcasts from a radio broadcaster.

FIGS. 2A-2B are schematic diagrams of a mobile station showing respectively relevant internal components and an exterior of a mobile station according to an embodiment of the invention.

DETAILED DESCRIPTION OF EMBODIMENTS OF THE INVENTION

Figure 3:
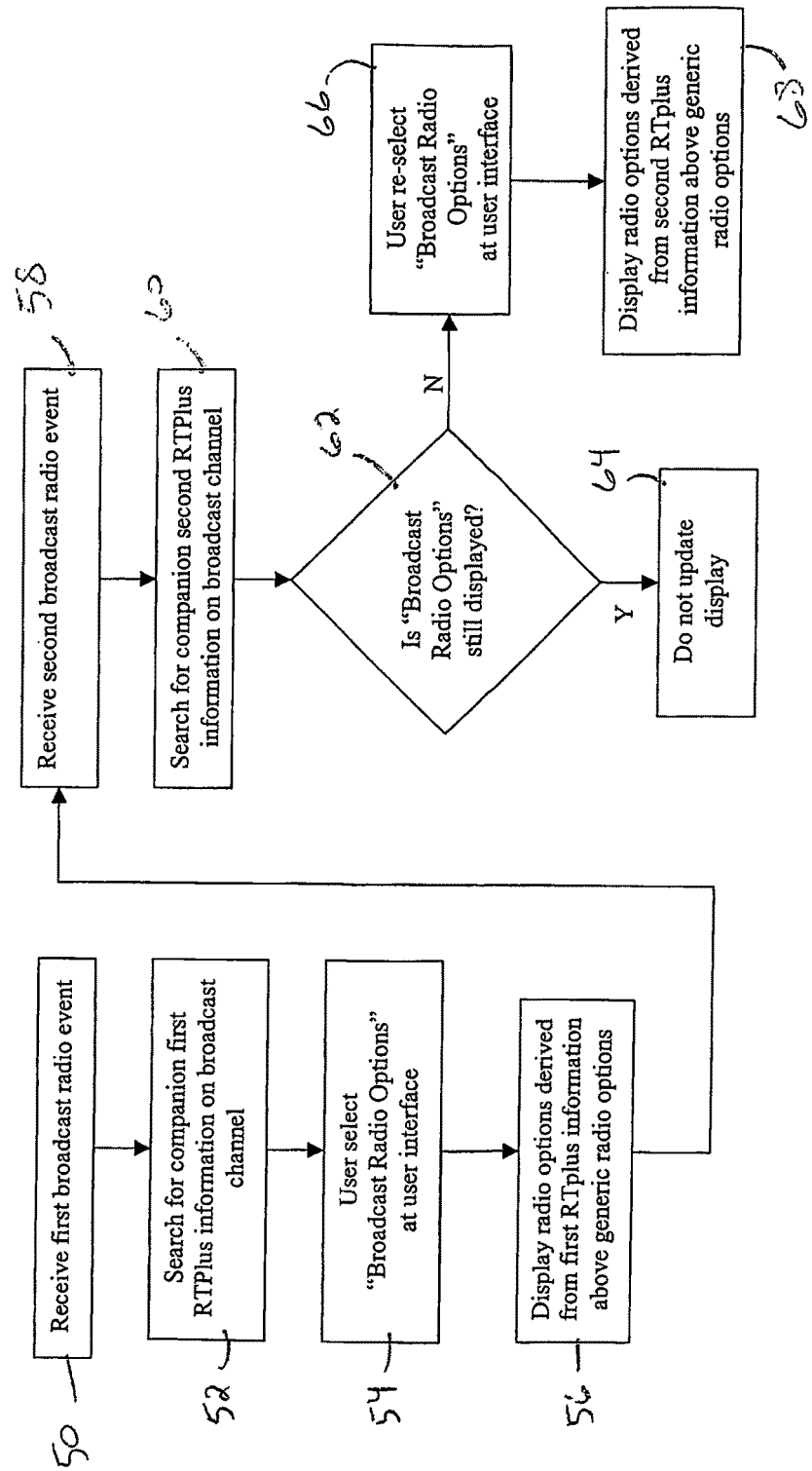
FIG. 3 is a process flow diagram illustrating steps in executing an embodiment of the present invention.

Portable electronic devices are increasingly multi-functional. Mobile stations such as cellular telephones now operate as personal digital assistants (PDAs) for managing contacts and calendars, broadcast radio receivers, Internet devices for wirelessly accessing the Internet, cameras, music storage and playing devices, and the like. Other non-telephone devices have become similarly multi-functional, as retail end users prefer to carry a lesser number of devices but increasingly desire more functionality in each. This invention enhances that multi-functionality by linking different applications to received RTplus information in a particularly user-friendly manner.

As an example of one radio-capable device, the Nokia model 6585 mobile station includes an integrated FM radio. An "options" menu associated with the FM radio function includes a list of user-selectable options including: "turn off"; "save channel"; "automatic tuning"; "manual tuning"; "set frequency"; "delete channel"; "loudspeaker"; and "mono/stereo output". None of these user-selectable options operate with any of the additional information provided by RDS or RTplus. While one RDS data field does include the frequency/channel, the "save channel" option on the model 6585 is not understood to utilize the RDS information, but rather to save the frequency to which the FM radio is currently tuned, regardless of RDS or RTplus. The inventors understand that the "save channel" function on the Nokia 6585 is fully functional even in geographic areas without RDS or RTplus. The "automatic" and "manual" tuning options search for frequencies having (typically) a signal to noise ratio above a threshold, as is long known in the radio arts. The "set frequency" option allows a user to manually input a frequency (e.g., 97.5 kHz) to which the radio then tunes. While RDS and RTplus might be available to end users in certain geographic areas, their use appears limited to displaying RDS data fields as text, such as "artist", "song title" and the like, while the associated song is being played on the FM radio.

Exemplary embodiments of this invention enable additional functionality in the mobile station (or other broadcast radio receiver device) from the RDS and RTplus information. An aspect of the invention is to provide a convenient and dynamically updated user interface by which a user may access that additional functionality.

The environment in which the invention operates is shown in FIG. 1. A broadcast radio transmitter 10 provides a broadcast radio signal with RDS/RTplus information over a unidirectional link 12 to a plurality of broadcast radio receivers, shown in FIG. 1 as mobile stations 14. The broadcast radio signal may originate with a terrestrial source or a space-based (satellite) source.

FIG. 2A illustrates a schematic diagram of major internal components of a mobile station MS 14 in which exemplary aspects of the invention may be embodied. The invention may be embodied, by example, in any host computing device having a graphical display element, a user input device, and a broadcast radio receiver adapted to decode RDS/RTplus, whether or not the device is mobile, whether or not it is coupled to a cellular of other data network or even capable of communicating with other devices via a network. A MS 14 is a handheld portable device that is capable of wirelessly accessing a communication network, such as a mobile telephony network of base stations that are coupled to a publicly switched telephone network. A cellular telephone, a Blackberry® device, and a personal digital assistant (PDA) with Internet or other two-way communication capability are examples of a MS 14. A portable wireless device includes mobile stations as well as additional handheld devices such as a PDA with a broadcast radio receiver. FIG. 2B illustrates exterior portions of the same MS 14.

The component blocks illustrated in FIGS. 2A-2B are functional and the functions described below may or may not be performed by a single physical entity as described with reference to FIGS. 2A-2B. A display driver 16, such as a circuit board for driving a graphical display screen 18, and an input driver 20, such as a circuit board for converting inputs from a keypad array 22 of user actuated buttons, joystick, and/or touch sensitive pad to electrical signals, are provided with the display screen 18 and keypad array 22 for interfacing with a user. The input driver 20 may also convert user inputs at the graphical display screen 18 when that display screen 18 is touch sensitive, as known in the art. The MS 14 further includes a power source 24 such as a self-contained battery that provides electrical power to a central processor unit CPU 26. The CPU or processor 26 controls functions within the MS 14. Within the processor 26 are functions such as digital sampling, decimation, interpolation, encoding and decoding, modulating and demodulating, encrypting and decrypting, spreading and despreading (for a CDMA compatible MS 14), and additional signal processing functions known in the art.

Voice or other aural inputs are received at a microphone 28 that may be coupled to the processor 26 through a buffer memory 30. Computer programs such as algorithms to modulate, encode and decode, data arrays such as look-up tables, and the like are stored in a main memory storage media 32 which may be an electronic, optical, or magnetic memory storage media as is known in the art for storing computer readable instructions and programs and data. The memory storage media 32 may also store personal files such as a calendar with user-entered entries, email addresses, SMS addresses, phone numbers, images, and the like as known in the art. The main memory 32 is typically partitioned into volatile and non-volatile portions, and is commonly dispersed among different storage units, some of which may be removable. The MS 14 communicates over a network link such as a mobile telephony link via one or more cellular antennas 34 that may be selectively coupled via a T/R switch 36, or a diplex filter, to a network transmitter 38 and a network receiver 40. The MS 14 further includes a broadcast radio receiver 42 coupled between the processor 26 and a broadcast radio antenna 44 that is particularly adapted to receive broadcast signals such as FM and AM. A single antenna may be resonant at multiple frequencies, and thereby serve as both the cellular antenna 34 and the broadcast radio antenna 44, as is known in the art. An RDS/RTplus decoder may be embodied in the broadcast radio receiver 42, in the processor 26, or as decoding software stored in the memory 32 and executed by the processor 26.

The MS 14 may additionally have tertiary transmitters and receivers for communicating over additional networks, such as a WLAN, WIFI, Bluetooth®, or to receive digital video broadcasts. Known antenna types include monopole, di-pole, planar inverted folded antenna PIFA, and others. The various antennas may be mounted primarily externally (e.g., whip) or completely internally of the MS 14 housing as illustrated. Audible output from the MS 14 is transduced at a speaker 46. Most of the above-described components, and especially the processor 26, are disposed on a main wiring board (not shown). Typically, the main wiring board includes a ground plane to which the antennas) 34, 44 are electrically coupled.

FIG. 3 illustrates in process step diagram form an exemplary embodiment of the invention. A first broadcast radio event is received at block 50. A broadcast event may be any discrete radio broadcast, including a song, an advertisement, a monologue, a station promotion, etc. The radio receiver then searches, at block 52 if necessary, for a first set of radio data fields (shown for convenience but not as a limitation as first RTplus information) corresponding to the first broadcast radio event. Note that not all radio data fields of RDS or RTplus correspond to a particular broadcast event. At least the EON flag, the AF flag, and the CF flag of RDS are unrelated to any particular broadcast of content, so are not associated with a broadcast radio event. Typically, RDS and RTplus information is broadcast simultaneously with the radio event. In some embodiments it is contemplated that radio data fields may be broadcast on a side channel separate from the radio event. Of particular interest to this invention are the RTplus fields within the classes information [INFO.xxx] and interactivity [PHONE.OTHER; EMAIL.OTHER; SMS.OTHER; and MMS.OTHER] of RTplus.

Once the radio data fields are obtained for the currently-playing (tuned to) radio event, it is determined at block 54 whether the user has selected, via the keypad array 22, to view what is termed herein as a "Broadcast Radio Options" screen on the graphical display 18 of the device 14. The broadcast radio options screen may be referred to by another name, but as used herein refers to a screen showing options that are available to a user of the device for managing the broadcast radio receiver 42 (e.g., tuning) and the device's response to it (e.g., volume). Some generic broadcast radio options include radio volume, a list of pre-stored/pre-programmed channels or frequencies, a selection between AM and FM bands, a mute option, and the like. A generic broadcast radio option is unrelated to a particular radio event that is being received, and is selectable by a user even where no RDS or RTplus information is being broadcast.

Note that in prior art RDS-enabled radio receivers the default screen for the display 18, when receiving a broadcast radio event, generally would show certain of the RDS fields as text (e.g., song title, artist, album, track number, etc.), perhaps alongside the frequency to which the radio receiver is tuned or the station identifier (an RDS field) or name of the program (another RDS field, e.g., "Morning Drive Time with Jim and Bev"). Unless the broadcast radio options screen is automatically selected by the device (e.g., as a default screen when first entering the FM radio mode, for example), some active user selection of that options screen is otherwise necessary. Once the user has selected the "Broadcast Radio Options" screen (while the current radio event is still being broadcast and received), at block 56 it is shown that the display 18 of the device shows an option derived from a data field (one or more fields of the first RTplus information) that is associated with that current radio event. In an embodiment, the option derived from RTplus information is displayed ahead of generic radio options, such as volume or channel list noted above. The term "ahead of" is used to mean having a priority position as viewed by a user. For a vertical list of options, placing the option(s) derived from RTplus information "ahead of" the listed generic options means placing it/them nearer the top of the list than the generic options, for example. For an arrangement of icons, placing those options derived from RTplus data fields ahead of generic radio options means placing the derived options further toward, for example, the top left as compared to the generic options. The above examples are in the western convention. Other regions and languages, such as Asian character-based languages, might read from right to left and/or bottom to top. Such other conventions would consider "ahead of" differently from the examples given above.

Figure 4:
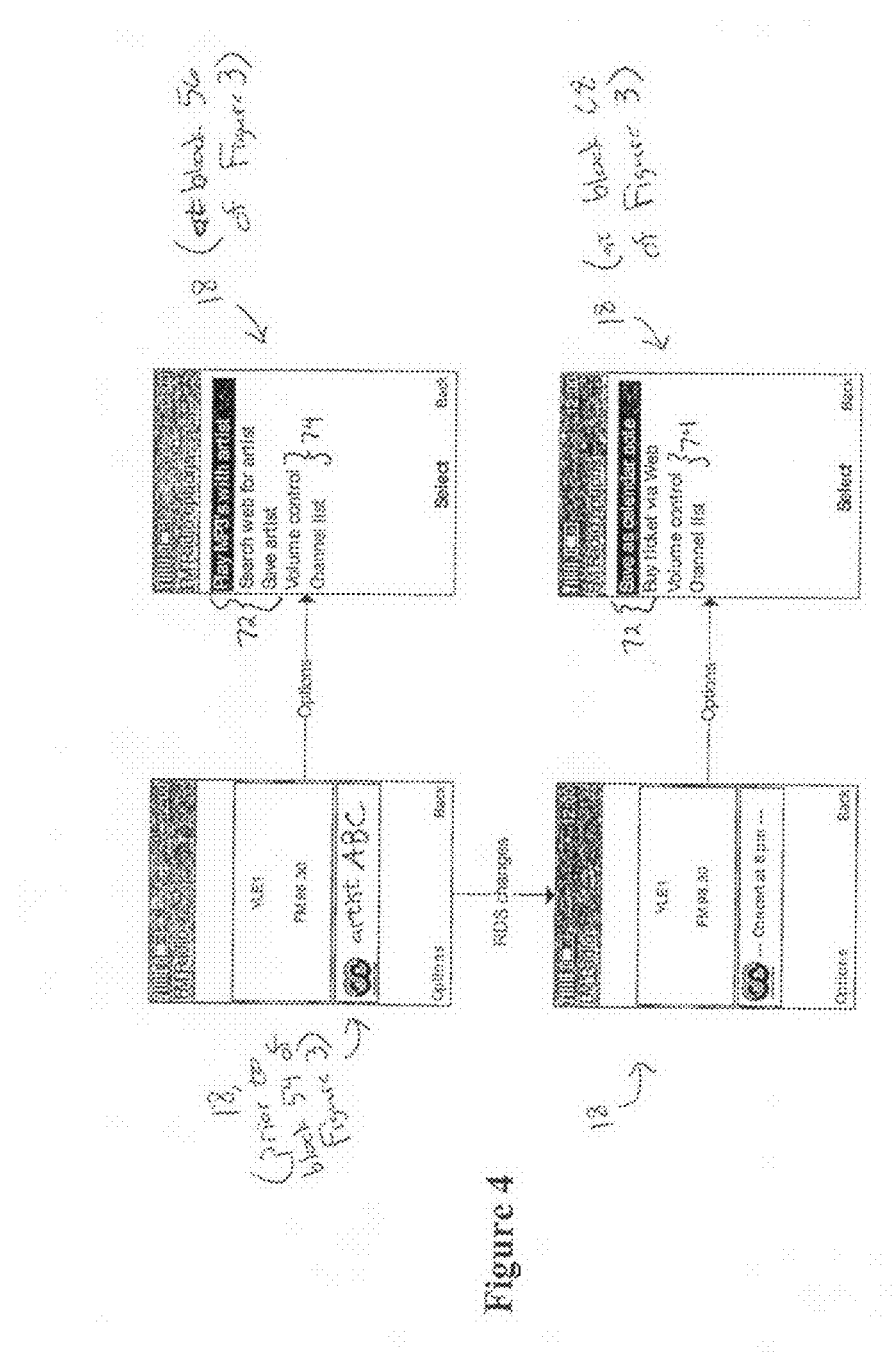
FIG. 4 is a series of isolated views of a graphical display of the mobile station of FIGS. 2A-2B according to an embodiment of the invention.

The result of blocks 54 and 56 at the graphical display screen 18 are shown in the upper pair of screen images at FIG. 4. In the upper left screen image of FIG. 4, the default image at the display 18, prior to block 54 of FIG. 3, is shown that displays as text the song title, such as may be taken from an RDS data field. At the lower left of that same screen image is the term "options" wherein a user can select to display broadcast radio options as in block 54 of FIG. 3. The top of that same screen image shows that the input device is "FM Radio" rather than a locally stored MP3 file. The upper left image of FIG. 4 may be the default screen shown on the device display 18, absent any other user selections when the device is configured to receive broadcast FM radio.

At the upper right hand side of FIG. 4 is the image displayed at the display 18 of the device as it would be at block 56 of FIG. 3, after the user selects the "options" choice from the default screen to bring up the "Broadcast Radio Options" screen. There is displayed a list of five user-selectable options. The top three are derived options 72, each derived from RTplus data fields; the lower two are generic options 74. Specifically, the option "Play MP3's with artist" is derived from the RDS/RTplus data field [ARTIST], since the receiving device does not know the artist identity from only the received broadcast song. Similarly, the derived options "search web for artist" and "save artist" are derived from that same RDS/RTplus data field [ARTIST]. The generic options 74 in the list are independent of the RDS/RTplus data fields. Any of these derived or generic options 72, 74 may be selected by a user by scrolling with the keypad array 22 to highlight one of them, and actuating the "Select" softkey shown at the bottom of the screen.

Continuing with the process steps at FIG. 3, consider now that the first broadcast radio event that was received from blocks 50 through 56 of FIG. 3 is now terminated and a subsequent, second broadcast radio event is being broadcast and received at block 58. The second radio event may be on the same channel or it may occur from the user changing the station to which the broadcast radio receiver is tuned. The source of the second radio event is not relevant, but rather that a second set of RTplus information is received at the device. At block 60, the device searches for the second set of RTplus information (broadcast radio data fields) associated typically with a second radio event. The default screen at the lower left corner of FIG. 4 shows that the second radio event is a promotion for a concert at 8 PM. In some embodiments, it is unnecessary that a second radio event be received; for example, towards the end of the song by artist ABC but while the song is still being broadcast, the RTplus information/data fields may change to carry information about a concert by artist ABC at 8 PM. In that instance, only the changed RTplus data fields is sufficient to cause the display 18 to change according to an embodiment of the invention, as detailed below.

An aspect of an embodiment of the invention is illustrated at blocks 62 and 64 of FIG. 3. If the displayed list of options from block 56 has not been changed from then through block 62, the display 18 does not change even though a different set of RTplus information is currently being broadcast to and received by the device. In effect, the display 18 of the 'broadcast radio options' screen is frozen for the user once selected, until another selection is made or the display is somehow changed. This allows the user more time to make a selection from, particularly, the derived options 72 relating to the first radio event even after the first radio event ends. In particular, block 62 at FIG. 3 queries whether the display from block 56 is still displayed. If YES (for example, if the device user has not selected a screen different from the 'broadcast radio options' between the time that block 56 took effect and the time the first set of RTplus information of block 54 was no longer broadcast and received at the device), then the substantive data on the display 18, arranged as in block 56, is held in place for the user at block 64. The display 18 is not updated with options related to the second set of RTplus information, despite that information being received at block 60.

If instead, after the time that the first set of RTplus information of block 54 was no longer broadcast and received at the device, the display 18 changed for any reason to other than the 'broadcast radio options' screen, and the second set of RTplus information of block 60 is received at the device, then the NO path from block 62 of FIG. 3 is taken. The display 18 may be changed, for example, by the user actively selecting another display or by automatically changing to a default display 18 after a timeout period during which no user inputs were made to the keypad array 22. In the event that the display 18 has been changed after the search in block 60 is successful, the process of FIG. 3 awaits at block 66 until the user again selects the 'broadcast radio options' for display. Once that display is again selected, block 68 takes effect and radio options derived 72 from the second set of RTplus information is displayed. As with the display of block 56, the derived options 72 may be displayed ahead of generic radio options 74.

The end result from block 68 is shown in the lower right corner of FIG. 4. Where the second radio event is a promotion for a concert as shown, the derived options 72 may include saving the second radio event as a calendar note, or accessing an Internet site to purchase tickets for the event, to name but two examples.

The device may be configured to search only for changes to RTplus information within one or more select classes or categories, such as information and/or interactivity classes. The derived options 72 may be considered in some embodiments to be commands to launch/execute an application that is separate and distinct from the broadcast radio application used to receive the radio event and RTplus information. The generic options 74 pertain to the broadcast radio application. To the contrary, a derived option 72 that links to the Internet when selected launches an Internet browser application, one that includes an email address launches an email program, and one that includes a telephone number launches a phone application and initiates a traffic channel over the mobile telephony network. Other derived options 72 may, when selected, execute applications strictly internal to the device, such as the derived options illustrated in FIG. 4 as "Play MP3's with artist" or "save as calendar note". These derived options execute respective MP3 player and calendar applications, also separate and distinct from the broadcast radio application. Considering the exemplary embodiments of the invention in the terms of computer program applications implies a device with a processor for executing the applications referenced by the derived options 72 and a computer memory for storing them. Many common devices today, portable or not, qualify under those parameters and could be readily adapted to practice embodiments of the invention described above.

The device may continuously scan for new radio data fields and/or events, it may continually compare currently received RTplus information against RTplus information previously received to examine whether a change has occurred, or it may periodically do either. Most efficiently, the device can continuously or periodically scan for a change to a particular class of RTplus information to change, such as one or both of the information or interactive classes.

Embodiments of this invention may be implemented by computer software executable by a data processor of the mobile station 14 or other host device, such as the processor 26, or by hardware, or by a combination of software and hardware. Further in this regard it should be noted that the various blocks of the logic flow diagram of FIG. 3 may represent program steps, or interconnected logic circuits, blocks and functions, or a combination of program steps and logic circuits, blocks and functions.

The memory or memories 32 may be of any type suitable to the local technical environment and may be implemented using any suitable data storage technology, such as semiconductor-based memory devices, magnetic memory devices and systems, optical memory devices and systems, fixed memory and removable memory. The data processor(s) 26 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is noted that the teachings of the present invention may be extended to any device configured to receive radio broadcasts and associated radio data fields and to display options to a user, including mobile stations, other hand-held devices, non-portable devices, and the like.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
    causing, at a device, an analog broadcast radio event and a plurality of radio data fields corresponding to the event to be received, where the event comprises a discrete audio broadcast;
    deriving at least one option from at least one of the radio data fields; and
    causing, simultaneous with outputting the analog broadcast radio event, a set of user-selectable options comprising the at least one option that is derived to be displayed.

2. The method of claim 1, wherein causing the set of user-selectable options to be displayed comprises ordering the at least one option that is derived to be displayed ahead of all other options of the set that are not derived from at least one of the plurality of radio data fields.

3. The method of claim 2, wherein the options of the set that are not derived from at least one of the plurality of radio data fields comprise at least one of volume and channel tuning.

4. The method of claim 1, wherein the said analog broadcast radio event is a first radio event, said plurality of radio data fields are a first plurality of radio data fields, and the said set of user-selectable options is a first set of user-selectable options,
    the method further comprising:
    causing, at the device, a second plurality of radio data fields that is not identical to the first plurality of radio data fields to be received; and
    causing a second set of user-selectable options, comprising at least one option that is derived from at least one of the second plurality of radio data fields, to be displayed.

5. The method of claim 4, wherein causing the second set of user-selectable options to be displayed is contingent upon a user re-selecting to display broadcast radio options after the second plurality of radio data fields is received at the device.

6. The method of claim 1, wherein the at least one option derived from at least one of the radio data fields comprises a link to an Internet page.

7. The method of claim 1, wherein the at least one radio data field from which the at least one option is derived comprises one of a telephone number, a short-message-service number, and an email address.

8. The method of claim 1, wherein the at least one option derived from at least one of the radio data fields comprises posting to a calendar function of the device an event date and time of the at least one of the radio data fields.

9. The method of claim 1, wherein the device comprises a handheld portable device.

10. The method of claim 1, wherein the radio data fields comprises RTplus fields.

11. An apparatus comprising at least one processor; and at least one memory including computer program code, the at least one memory and the computer program code configured to, with the at least one processor, cause the apparatus to perform at least the following:
    to receive an analog broadcast radio event and a plurality of associated radio data fields corresponding to the event, where the event comprises a discrete audio broadcast;
    to derive at least one option from at least one of the radio data fields; and
    simultaneous with outputting the analog broadcast radio event, to display a set of user-selectable options comprising the at least one option that is derived.

12. The apparatus of claim 11, wherein the at least one memory and the computer program code are further configured to cause the apparatus to display the set of user-selectable options such that the at least one option of the set derived from at least one of the data fields is displayed ahead of all other options of the set that are not derived from at least one of the plurality of radio data fields.

13. The apparatus of claim 11, wherein the at least one memory and the computer program code are further configured to cause the apparatus, concurrent with the receiver receiving a separate second set of radio data fields, to display a second set of user-selectable options, at least one option of the second set derived from at least one of the second set of radio data fields.

14. The apparatus of claim 13, wherein the at least one memory and the computer program code are further configured to cause the apparatus to display the second set of user-selectable options only upon satisfying the condition that a user selects to display broadcast radio options after the second plurality of radio data fields is received at the apparatus.

15. The apparatus of claim 11, wherein the at least one memory is configured to store at least a broadcast radio application and another application distinct from the radio application, wherein the at least one memory and the computer program code are further configured to cause the apparatus to execute the another application in response to a user selection of the at least one option derived from at least one of the radio data fields.

16. The apparatus of claim 11 comprising a mobile station.

17. A program of machine-readable instructions, tangibly embodied on an information bearing medium and executable by a digital data processor, to perform actions comprising:
    causing an analog broadcast radio event and a plurality of radio data fields corresponding to the event to be received, where the event comprises a discrete audio broadcast;
    deriving at least one option from at least one of the radio data fields; and
    causing while outputting the analog broadcast radio event, a set of user-selectable options to be displayed comprising the at least one option that is derived from the at least one radio data field.

18. The program of claim 17, wherein causing the set of user-selectable options to be displayed comprises causing to display the set such that the at least one option that is derived from at least one of the radio data fields is displayed ahead of all other options of the set that are not derived from at least one of the radio data fields.

19. The program of claim 17, wherein the said set of user selectable options comprises a first set, and the said at least one option is derived from at least one of a first set of radio data fields, the actions further comprising:

responsive to receipt of a second set of broadcast radio data fields, causing a second set of user-selectable options to be displayed comprising at least one option that is derived from at least one of the second set of radio data fields.

20. The program of claim 19, wherein causing the second set of user-selectable options to be displayed is contingent upon receiving, after receipt of the second set of user-selectable options, a user selection to display broadcast radio options.

21. An apparatus comprising:
means for receiving at a device an analog broadcast radio event and a plurality of radio data fields corresponding to the event, where the event comprises a discrete audio broadcast;
means for deriving from at least one broadcast radio data field of the radio data fields a derived option; and
means for displaying a plurality of broadcast radio options simultaneous with outputting the analog broadcast radio event, said plurality of broadcast radio options comprising the derived option.

22. The apparatus of claim 21, wherein:
the means for deriving comprises a broadcast radio receiver for receiving radio events and associated RTplus information coupled between an antenna and a processor; and the means for displaying comprises a graphical display screen coupled to the processor.

* * * * *